US006694867B1

(12) United States Patent
Roth

(10) Patent No.: US 6,694,867 B1
(45) Date of Patent: Feb. 24, 2004

(54) SCRAPER DEVICE AND SCRAPER SYSTEM

(75) Inventor: Eldon Roth, Dakota Dunes, SD (US)

(73) Assignee: Freezing Machines, Inc., Dakota Dunes, SD (US)

( * ) Notice: Subject to any disclaimer, the term of this patent is extended or adjusted under 35 U.S.C. 154(b) by 0 days.

(21) Appl. No.: 10/403,724

(22) Filed: Mar. 31, 2003

(51) Int. Cl.$^{7}$ .............................. A23L 1/00; B01F 7/08; B01F 11/00

(52) U.S. Cl. ........................... 99/348; 99/353; 366/144; 366/310; 366/312

(58) Field of Search ........................... 99/325–335, 348, 99/357, 352–355, 403–410, 468, 483, 452–455; 366/144–146, 149, 309–313, 318–324; 62/342, 343; 426/520, 523, 519, 438; 425/207, 228

(56) References Cited

U.S. PATENT DOCUMENTS

| | | | | | |
|---|---|---|---|---|---|
| 1,253,543 | A | * | 1/1918 | Stokes | 356/325.3 |
| 2,506,101 | A | * | 5/1950 | Oltz | 366/309 |
| 2,509,543 | A | * | 5/1950 | Truax | 366/288 |
| 4,014,525 | A | * | 3/1977 | Oda et al. | 366/99 |
| 4,733,607 | A | | 3/1988 | Star et al. | |
| 4,941,132 | A | | 7/1990 | Horn et al. | |
| 5,083,506 | A | * | 1/1992 | Horn et al. | 99/348 |
| 5,228,775 | A | | 7/1993 | Horn et al. | |
| 5,299,865 | A | * | 4/1994 | Presnell | 366/300 |
| 5,341,729 | A | * | 8/1994 | Zittel | 99/348 |
| 5,429,041 | A | * | 7/1995 | Zittel | 99/348 |
| 5,450,786 | A | * | 9/1995 | Muntener | 99/485 |
| 5,897,206 | A | * | 4/1999 | Hall | 366/320 |
| 6,578,468 | B1 | * | 6/2003 | Horn | 99/334 |

* cited by examiner

*Primary Examiner*—Timothy F. Simone
(74) *Attorney, Agent, or Firm*—Russell D. Cultbertson; Shaffer & Culbertson, L.L.P.

(57) ABSTRACT

A scraper device includes a scraper fixture which is adapted to be placed in a working position adjacent to a surface to be scraped. At least one flex arm is connected at its proximal end to the scraper fixture and includes a distal end extending from the fixture toward the surface to be scraped when the scraper fixture is in the working position. A scraper plate is located at the distal end of the flex arm and extends at an acute scraping angle with respect to the surface to be scraped when the fixture is in the working position. In this position, a scraping edge of the scraper plate makes contact with the surface to be scraped to provide a scraping action as the scraper device is driven over the surface to be scraped.

28 Claims, 5 Drawing Sheets

SCRAPER DEVICE AND SCRAPER SYSTEM

TECHNICAL FIELD OF THE INVENTION

This invention relates to scraper devices for scraping the surface of a vessel. The scraper device and system according to the invention are particularly adapted for scraping the surfaces of a vessel in which a foodstuff is cooked or cooled.

BACKGROUND OF THE INVENTION

Foodstuff cooking operations commonly apply cooking heat to a foodstuff through the surfaces of a vessel in which the foodstuff is contained. Because the vessels may be large in commercial cooking operations and because the heat is applied only through the vessel walls, commercial cooking devices commonly include a mixing or agitating structure that continuously agitates the material in the vessel during the course of cooking. These agitating arrangements are necessary to produce even cooking throughout the material in the vessel and speed up the cooking process.

However, mixers or agitators in the cooking vessel are sometimes insufficient to prevent foodstuff from cooking or burning onto the vessel walls through which heat is applied. Where the foodstuff being cooked does cook or burn onto the vessel walls, special scraping devices may be used within the vessel to periodically scrape across the surfaces of the vessel through which heat is applied and remove any buildup.

Scraping devices may also be required to periodically scrape the surfaces of a vessel in which a foodstuff is being cooled rather than cooked. In the case of a vessel used to cool a foodstuff, the foodstuff may tend to stick to the surfaces of the vessel and inhibit the cooling operation. Scrapers are required in these instances to remove the material sticking to the vessel surfaces and allow the remaining material to be cooled more effectively.

U.S. Pat. No. 4,733,607 discloses a device commonly referred to as a jacketed blender which may be used in commercial cooking or cooling operations. A jacketed blender includes one or more roughly semicircular troughs each surrounded at least partially by a jacket through which a heating or cooling material may be circulated. Each trough includes a separate agitator device. The respective agitator is rotated about its longitudinal drive axis to agitate the material in the trough and thereby allow the device to apply or remove heat more evenly to the material in the trough and thus provide more even cooling or cooking. U.S. Pat. No. 4,733,607 shows helical agitating members commonly referred to as ribbons. Paddles or other agitating structures may also be employed for the purpose of mixing or agitating the contents of the vessel during the cooking or cooling process.

The particular jacketed blender shown in U.S. Pat. No. 4,733,607 also includes a number of scrapers mounted at different points along the length of each agitator ribbon. Each scraper includes a block of material having a flat bottom surface with steep front and back sides that intersect with the flat bottom surface to form front and back scraping edges. In one embodiment shown in the patent, the scraper blocks are each mounted on a post extending from the ribbon generally parallel to the ribbon drive axis. In an alternative arrangement shown in U.S. Pat. No. 4,733,607, each scraper block is connected to the respective ribbon through an elongated flat member extending transversely from the ribbon. The elongated flat support is configured to twist from side to side about the support's longitudinal axis and to flex along a line extending perpendicular to the vessel surface. The scraper block is connected to the end of this elongated flat member. In both embodiments, the supports for the scraper blocks place one or both scraping edges in contact with the vessel surface so that one edge scrapes across the vessel surface as the agitator ribbon is driven about its longitudinal drive axis. The front and back scraping edges allow the scraper block to provide the scraping action against the vessel surfaces regardless of the direction in which the agitator ribbon is rotated.

One problem with the scraper block shown in U.S. Pat. No. 4,733,607 is that the scraping edges tend to wear over a relatively short period of time to produce a rounded surface that extends between the flat bottom surface and steep side surface. This rounded surface produces an ineffective scraping action against the vessel wall and requires that the scraper block be replaced. Replacing the scraper blocks adds significantly to operating costs due to the cost of new scraper blocks and cost of labor associated with changing out the scraper blocks. Perhaps more importantly, the device must be taken out of service in order to change the scraper blocks and thus these types of scraper blocks can decrease productivity. Furthermore, wear in the scraper blocks causes the device to produce an inconsistent product especially when the device is used to cook a foodstuff. More particularly, as the scraper blocks wear and thus become less effective at scraping the surfaces of the vessel, the foodstuff will cook-on or burn-on more to the vessel surfaces and much of this burnt-on or cooked-on material is eventually mixed with the remaining foodstuff, changing the character of the final product. When the scraper blocks are new, the cooked foodstuff will contain relatively little of the burnt-on or cooked-on material. However, the final product will include more and more of this burnt-on or cooked-on material as the scraper blocks wear.

Other problems with the type of scraper shown in U.S. Pat. No. 4,733,607 relate to the manner in which the scraper block is connected to the ribbon element. The connection includes small openings that can trap foodstuff in the course of operations, and making the scrapers unsanitary. Also, as the agitator element rotates in the vessel, the contact between the scraper block and the vessel surface together with the contact between the scraper block and the material being cooked in the vessel place a good deal of force on the scraper block in a direction opposite to the direction that the scraper block is driven. This force is ultimately transferred to the ribbon through the base of the post or member on which the scraper block is mounted. Depending upon the nature of the foodstuff being cooked and the speed at which the ribbon is rotated, the torque applied to the ribbon material through the scraper support post or flat support member may be substantial and may cause significant deflections in the ribbon material which may ultimately lead to fatigue in the ribbon material. Deflection in the ribbon material also causes the scrapers to apply force unevenly to the vessel surfaces and produces rapid wear at certain points in the scrapers and excessive wear in the vessel walls.

SUMMARY OF THE INVENTION

The present invention includes both a scraper device and a scraper system employing the scraper device. The scraper device includes a fixture or scraper fixture which is adapted to be placed in a working position adjacent to a surface to be scraped. At least one flex arm is connected at its proximal end to the scraper fixture and includes a distal end extending from the fixture toward the surface to be scraped when the scraper fixture is in the working position. A scraper plate is located at the distal end of the flex arm and extends at an acute scraping angle with respect to the surface to be scraped when the fixture is in the working position. In this position, a scraping edge of the scraper plate makes contact with the surface to be scraped. The shallow angle between the scraper plate and surface to be scraped, combined with the flexible nature of the flex arm and loading on the flex arm when the scraper fixture is in the working position combine to produce a robust and effective scraping action between the scraper plate and the surface to be scraped as the scraper fixture moves laterally relative to the surface. Although a scraper according to the present invention is highly effective at scraping the desired surface, the flexible nature of the flex arm and the angle between the scraper plate and surface to be scraped combine to produce a relatively gentle scraping action that does not produce undue wear to the surface to be scraped.

A scraper system according to the present invention includes at least one scraper device and a support for supporting the scraper fixture of the device in the working position with respect to the surface to be scraped. The support may be associated with a mixing or agitating element, such as the ribbon of a ribbon agitating structure, or may be separate from any agitating device. In either case, one preferred form of the invention includes one and preferably several scraper devices that extend along substantially the entire length of the vessel to be scraped. These long scraper devices each produce a complete scraping of the vessel on each revolution of the support structure and may allow the support structure to be driven more slowly while still preventing undesirable sticking at the heat transfer surfaces of the vessel.

Preferred forms of the invention include two flex arms, a first flex arm extending along a device movement axis from one side of the fixture and an additional or second flex arm extending from the opposite side of the scraper fixture along the device movement axis. Each flex arm includes a respective scraper plate extending at a respective acute angle to the surface to be scraped with a respective scraping edge contacting the surface to be scraped when the scraper fixture is held in the working position. With both scraper plates extending at an acute angle to the surface to be scraped, the scraper device may be configured to include a relatively deep concave relief area defined between the opposing scraping edges. This is in contrast to the flat bottom of the scraper block shown in U.S. Pat. No. 4,733,607. The flex arms and respective scraper plates located on opposite sides of the scraper fixture along the device movement axis allow this preferred form of scraper device to be driven in either direction along the device movement axis to provide the desired scraping action.

The scraper fixture may include upper and lower clamping surfaces that hold the flex arm or flex arms at a desired angle with respect to the surface to be scraped. Because a preferred scraper device includes first and second flex arms on either side of the device, the scraper fixture may be thought of as having a first set of upper and lower clamping surfaces on one side for holding the first flex arm and a second set of upper and lower clamping surfaces on the opposite side for holding the second flex arm.

Each flex arm and respective scraper plate may be formed from a common sheet or plate of material. Also, both the flex arms and respective scraper plates in forms of invention including two sets of such components may be formed from a common sheet or plate of material. Where the scraper device includes two oppositely extending flex arms formed from a common plate of material, the upper and lower clamping surfaces of the scraper fixture may include a curve which impresses a curvature on a central portion of the plate. This curvature in the plate material positions the flex arms so that they extend at the desired angle downwardly toward the surface to be scraped.

The scraper device according to the invention may be connected to a post or flexible member extending laterally or transversely from an agitator ribbon similar to the scraper blocks shown in U.S. Pat. No. 4,733,607. Alternatively, the scraper device may be connected to a support which is welded or otherwise formed in the agitator element. In this preferred form of the invention, and where the agitator element comprises a ribbon of material, the fixture extends on both sides of the ribbon material along a longitudinal axis extending transverse to the ribbon. The fixture is preferably centered on the ribbon so that substantially equal forces are applied to the fixture as the ribbon is driven about its drive axis. This equalization of forces on either side of the ribbon material substantially eliminates any bending or deflecting in the ribbon material occasioned by the forces applied to the scraper device as the device is driven in a scraping operation.

In some forms of the invention the forces applied to the scraper device as the device is moved through the material within the vessel may be reduced by configuring the flex arm as a number of separate members spaced apart along the longitudinal axis of the scraper device. The openings between the separate members making up the flex arm effectively reduce the profile of the scraper device and in so doing reduce the force applied to the scraper as it is driven through the material in the vessel.

These and other advantages and features of the invention will be apparent from the following description of the preferred embodiments, considered along with the accompanying drawings.

DESCRIPTION OF PREFERRED EMBODIMENTS

Figure 1:
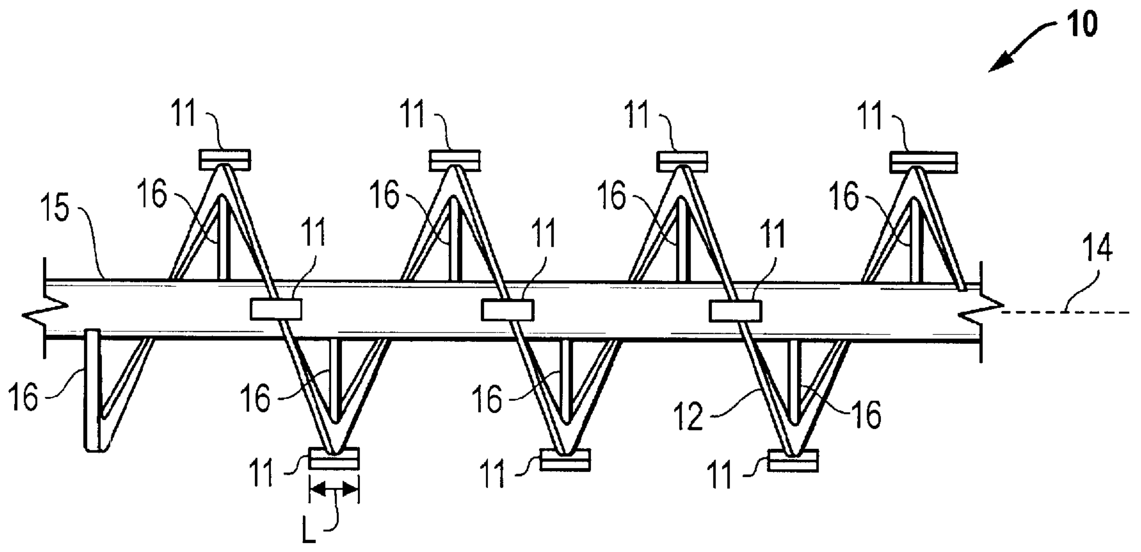
FIG. 1 is a side view of a scraper system embodying the principles of the present invention.
Figure 2:
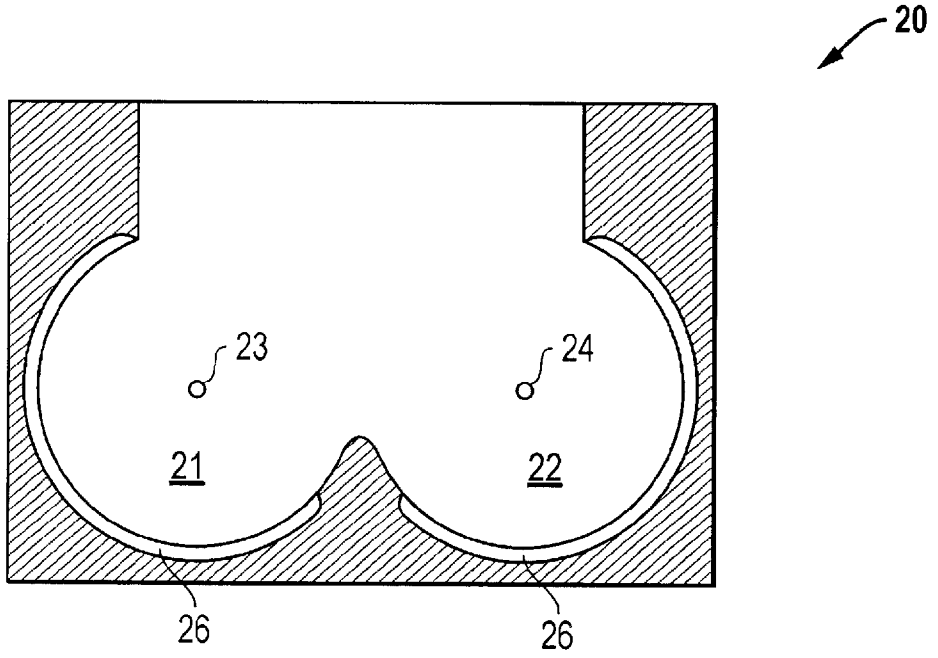
FIG. 2 is a transverse section view of a prior art vessel within which the scraper system shown in FIG. 1 may be used.

Referring to FIG. 1, a scraper system 10 embodying the principles of the present invention includes one or more scraper devices 11 mounted on a support structure 12 which is adapted to be driven about a drive axis 14. The illustrated support structure 12 comprises a ribbon-type mixing or agitating element, connected to a drive shaft 15 with connecting members 16. Scraper system 10 is adapted to be mounted within a vessel such as the vessel 20 shown in FIG. 2. This vessel 20 includes two troughs 21 and 22. It will be appreciated that troughs 21 and 22 are elongated and extend along a respective longitudinal axis extending perpendicular to the plane of FIG. 2. Each trough 21 and 22 receives one scraper system 10 mounted so that the longitudinal axis of the respective drive shaft 15 coincides with the center axis of the curved surface making up the respective trough. These axes are shown at reference numerals 23 and 24 in FIG. 2.

Scraper system 10 operates as drive shaft 15 is rotated by a suitable drive arrangement not shown in the figures. The drive arrangement and associated equipment are omitted from the drawings so as not to obscure the present invention in unnecessary detail. As drive shaft 15 is rotated about its longitudinal axis or drive axis 14, the various scraper devices 11 mounted on support structure 12 periodically come into contact with a surface to be scraped. In the example vessel 20 shown in FIG. 2, this surface to be scraped comprises the roughly semicircular or semi-cylindrical surface of the respective trough 21 and 22 surrounded by a heating/cooling jacket 26. It is this surface in the illustrated vessel 20 through which heat is transferred to or from the contents of the vessel and which is most susceptible to foodstuff sticking. In the form of the scraper system 10 shown in FIG. 1, several scraper devices 11 are required to provide complete scraper coverage of the entire surface of the vessel. Each scraper device 11 travels about a circle as the support structure 12 is driven on drive shaft 15 and scrapes a section or band of the vessel surface having a width equal to the length of the scraper shown at dimension L in FIG. 1. These scraping bands combine to cover the entire surface to be scraped.

It will be appreciated that vessel 20 is shown only for purposes of example and that the invention is not limited to use with any particular type of vessel. In particular, although vessel 20 includes two horizontal troughs 21 and 22, scrapers and scraper systems according to the present invention may be used in vessels including more or fewer horizontal troughs. Also, scraper systems and scraper devices according to the present invention may be used in fully cylindrical vessels as opposed to the semi-cylindrical troughs 21 and 22. Scraper systems and scraper devices embodying the present invention may also be used to scrape flat or other curved surfaces and not merely the cylindrical surfaces illustrated in FIG. 2 for purposes of example.

Figure 3:
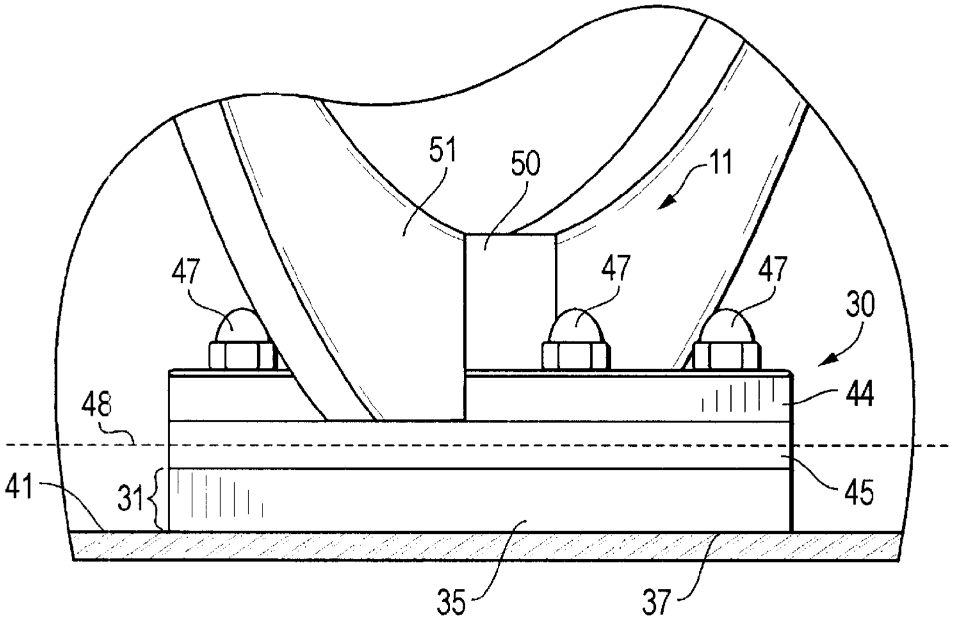
FIG. 3 is a front view of a scraper device embodying the principles of the invention connected in a ribbon-type mixing element.
Figure 4:
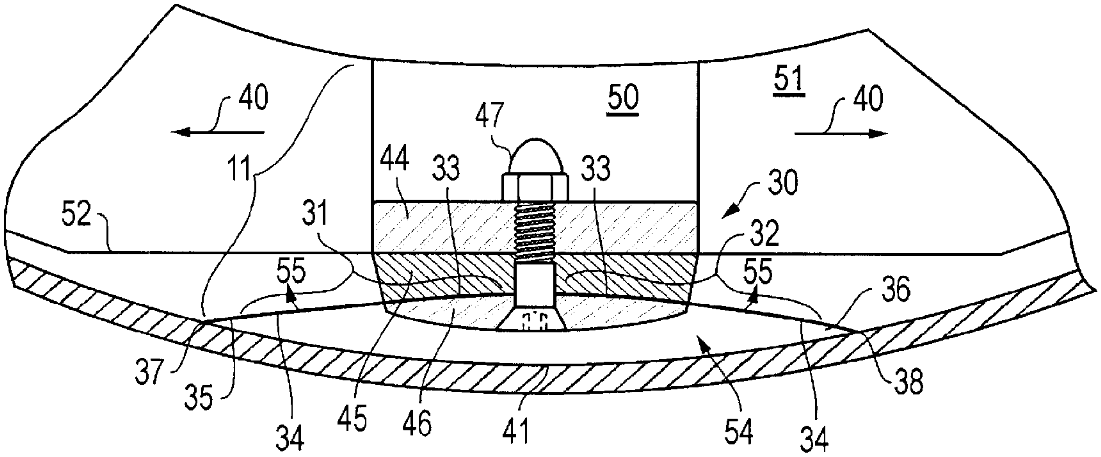
FIG. 4 is a partial section view taken along line 4—4 in FIG. 5, and showing a connecting bolt in elevation.
Figure 5:
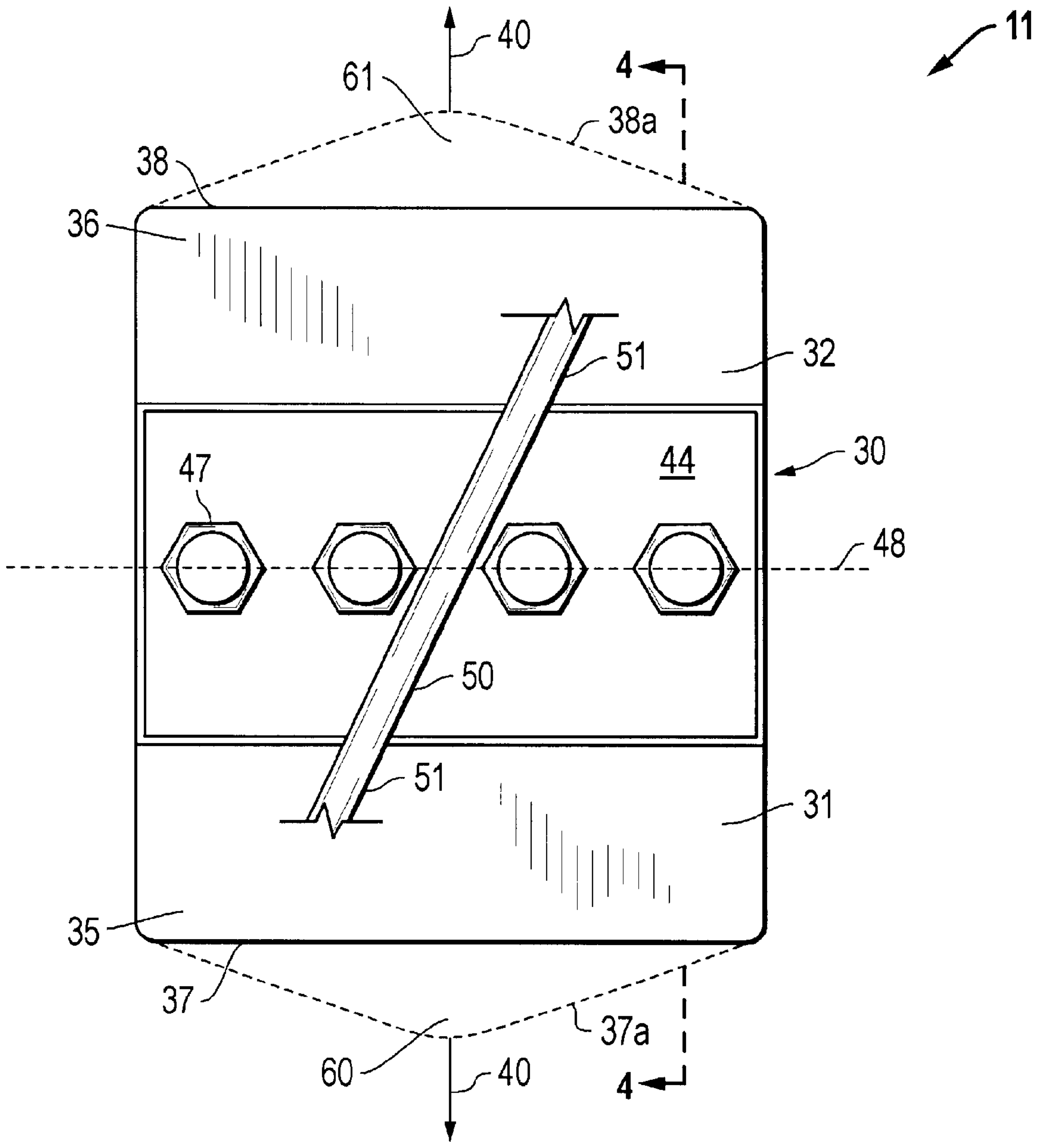
FIG. 5 is a top view of the scraper device shown in FIG. 3, and includes dashed lines showing an alternate scraping edge configuration in accordance with the present invention.

Referring now to FIGS. 3 through 5, each scraper device 11 includes a fixture or scraper fixture 30 and a first flex arm 31 extending from one-side of the scraper fixture. As shown in FIGS. 4 and 5, a second flex arm 32 extends from the opposite side of scraper fixture 30. A proximal end 33 of each flex arm 31 and 32 is connected to scraper fixture 30 and a distal end 34 of each flex arm includes or is connected to a scraper plate having a scraping edge adapted to make contact with the surface to be scraped to provide the desired scraping action. The scraper plate associated with first flex arm 31 is shown at reference numeral 35 and the scraper plate associated with second flex arm 32 is shown at reference numeral 36. First scraper plate 35 includes a first scraping edge 37 and second scraper plate 36 includes a second scraping edge 38 (FIG. 5). The angle at which the scraper plates extend to the surface to the scraped is important to the operation of the present invention and will be described in detail below with particular reference to the diagrammatic representation of FIG. 6.

Scraper device 11 shown in FIGS. 3 through 5, including first flex arm 31 and first scraper plate 35 on one side of fixture 30 and second flex arm 32 and second scraper plate 36 on the opposite side of the fixture, is adapted to be driven in either direction along a movement axis 40 shown in FIGS. 4 and 5. Motion along this movement axis 40 in either direction moves scraper device 11 along the surface to be scraped, which is shown at reference numeral 41. When scraper device 11 is moved along movement axis 40 to the left in FIG. 4, first scraper plate 35 and first scraping edge 37 provide the desired scraping action. When scraper device 11 is moved along movement axis 40 to the right in FIG. 4, second scraper plate 36 and second scraping edge 38 shown in FIG. 5 provide the desired scraping action. It should be borne in mind that although some scraper devices such as device 11 illustrated in FIGS. 3 through 5 are adapted for scraping in either a forward or rearward direction, other forms of the invention may be adapted to scrape only in one direction. Scraper devices according to the present invention for scraping in only a single direction may dispense with the second flex arm and scraper plate and include only a single flex arm extending from one side of the scraper fixture with a single scraper plate and scraping edge.

As shown best in FIG. 4, the scraper fixture 30 includes a base 44, an upper clamp component 45, and a lower clamp component 46 connected together by bolts 47 spaced apart along the longitudinal axis 48 (shown in FIG. 5) of the scraper device. Clamp components 45 and 46 connect together to support and retain the flex arms 31 and 32. In embodiments such as that shown in FIGS. 3 through 5 which include forward and rearward or first and second flex arms, the clamp components 45 and 46 may be thought of as having two separate sets of upper and lower clamping elements, one for each flex arm.

Although forms of the invention may include discrete components making up each combination of flex arm and scraper plate, each flex arm and its respective scraper plate may be integrally formed from a common plate of material. Furthermore, in forms of the present scraper device having two oppositely extending flex arms, both flex arms and both scraper plates may be formed from a common sheet or plate of suitable material. The illustrated scraper device 11 employs a common plate or sheet of material making up both flex arms 31 and 32 and both scraper plates 35 and 36. The scraper plates 35 and 36 simply comprise lateral or left and right end portions of the common plate of material while the flex arms comprise the inner portions of the plate of material on either side of a center line which, in the illustrated embodiment, coincides with scraper device axis 48 shown in FIG. 5. It will be appreciated that in this common plate or sheet embodiment of the invention, the plate or sheet of material will include openings for receiving bolts 47.

In forms of the invention including a single common plate making up both flex arms 31 and 32 and their respective scraper plates, the upper and lower clamp components 45 and 46 mate together along a curve that is concave facing the surface 41 to be scraped. This concave curvature forces a curvature or arc on the material making up flex arms 31 and 32 as best shown in FIG. 4. This curvature or arc produces the desired angle of the flex arm 31 and 32 and respective scraper plate with the surface 41 to be scraped. The angle of the scraper plates 35 and 36 with respect to the surface 41 to be scraped may be modified simply by changing to upper and lower clamp components 45 and 46 having different curvature along the mating surfaces.

Scraper fixture base 44 is connected to the ribbon making up support structure 12 through an upright portion 50 which is preferably integrally formed with the base. The ribbon material will be referenced by numeral 51 for purposes of describing the illustrated connection between fixture 30 and support structure 12. Upright portion 50 is connected in ribbon 51 by cutting out a section of the ribbon material and attaching the upright portion preferably by welding it in the ribbon material in the place of the removed section of ribbon material. It will also be noted particularly from FIG. 4 that a notch 52 may be machined or otherwise formed in ribbon 51 to make room for clamp components 45 and 46, and to make room for the portions of the flex arms that traverse the ribbon. It will be noted that the distance between the bottom of notch 52 in ribbon 51 and the top of the flex arm traversing the ribbon material is preferably designed to be relatively large to prevent foodstuff from being captured in that space.

Referring particularly to FIG. 4, the flex arms 31 and 32 and scraper plates 35 and 36 define a deep concave relief surface forming a relief area 54 between the surface 41 to be scraped and the scraper plates and flex arms. This relief area 54 helps ensure a consistent scraping action even as the material at the scraping edges wears over long periods of use. That is, the scraper configuration with recess or relief area 54 shown particularly in FIG. 4 helps avoid the problem of wear and rounding at the bottom surface that may occur in flat bottomed scrapers. Also, the deep concave and open-ended relief area that may be achieved with the present invention avoids trapping material that might ultimately burn in cooking operations. Relief area 54 may be configured to be approximately 0.25 inches deep or more to prevent undesirable trapping of material.

Scraper fixture 30 is shown in FIGS. 3 and 4 in a working position with respect to the surface 41 to be scraped. In this working position, scraper fixture 30 is spaced apart from the surface 41 to be scraped at a distance small enough to allow scraping edges 37 and 38 of scraper plates 35 and 36, respectively, to contact the surface to the scraped. This contact flexes or deflects-the respective flex arm 31 or 32 upwardly as indicated by arrow 55 in FIG. 4. This deflection is, however, not sufficient to permanently deform the material making up the flex arms 31 and 32. Because the flex arm deflection is in the range of elastic deformation of the flex arm material, the flex arms 31 and 32 effectively press the respective scraping edges 37 or 38 against the surface 41 to be scraped when scraper fixture 30 is held in the working position. This force pressing the scraping edges 37 and 38 against the surface 41 to be scraped helps to produce the desired scraping action as the scraper device 11 is driven along the scraping or movement axis 40 shown in FIG. 5. Using relatively stiffer material for flex arms 31 and 32 may also be used to apply greater force to scraping edges 37 and 38 and thereby provide enhanced scraping.

As shown best in the top view of FIG. 5, the preferred scraper fixture 30 extends transversely to ribbon 51 on both sides thereof. This extension on both sides of ribbon 51 minimizes the torque applied to the ribbon (about an axis perpendicular to the plane of the drawing) that would tend to deflect the ribbon out of its natural or relaxed path. However, it will be appreciated that a scraper device according to the present invention may be connected on a suitable support extending from one side of ribbon 51 similar to the arrangement shown in U.S. Pat. No. 4,733,607. Also, although the preferred scraper fixture 30 extends an equal distance on each side of ribbon 51, there may be occasions in which it is desirable for the fixture and scraper device to extend further on one side than the other. The right most scraper device shown in FIG. 1 is an example of a scraper device within the scope of the present invention that is mounted asymmetrically on the ribbon to help ensure complete scraper coverage over the surface to be scraped.

FIG. 5 shows that the scraping edges 37 and 38 may extend generally parallel to the longitudinal axis 48 of the scraper device. Alternative forms of the invention may include scraping edges 37*a* and 38*a* that do not run parallel to device longitudinal axis 48. These alternate scraping edges 37*a* and 38*a* each include a portion, 60 and 61, respectively, that extends further from the middle of the device than the remainder of the respective edge. These leading portions 60 and 61 of scraping edges 37*a* and 38*a* are particularly useful in vessels such as that shown in FIG. 2 in which the scraper devices are periodically driven out of contact with the vessel surface and then make contact again as the support structure is rotated further. Leading portion 60 or 61, depending upon which way the scraper device is driven along drive axis 40, makes first contact with the vessel. The remainder of the respective scraping edge makes contact later as the scraper device is driven further along drive axis 40. This is in contrast to the edge 37 or 38 that makes contact with the vessel surface all at once.

Leading portions 60 and 61 are shown generally centered along the respective scraping edge. Other embodiments of the invention may include such leading portions off center or positioned at one side of the respective scraping edge. The present invention encompasses any of these leading portion configurations.

The nature of the material forming the flex arms 31 and 32 and scraper plates 35 and 36 is critical to the proper operation of scraper device 11. In particular, the material is preferably highly resistant to fatigue that may be caused by the flexing in the flex arms 31 and 32 in the course of operation. Suitable materials for the plate-type flex arms 31 and 32 shown in the figures include a flexible stainless steel such as 0.032 inch thick, three-quarter hard stainless steel, austenitic microstructure such as that available through Sandvik Process Systems, Inc. and commonly used for solid metal conveyor belts. However, any plate material that provides suitable resistance to fatigue stress and suitable flexibility/stiffness may be used to produce the flex arms and scraper plates. Regardless of the remainder of a scraper plate according to the present invention, each scraping edge (37, 38, 37*a*, and 38*a*) is preferably made from a suitable metal to provide a superior scraping action. The upright components and base of the scraper device are preferably made from a suitable stainless steel which may be welded in the stainless steel ribbon 51. Upper and lower clamp components 45 and 46, respectively, may be formed from a suitable plastic such as high-density polyethylene or other plastic material suitable for use in food processing equipment. Alternatively, one or both of the upper and lower clamp components 45 and 46 may be made from a metal such as a stainless steel suitable for use in food processing equipment.

Figure 6:
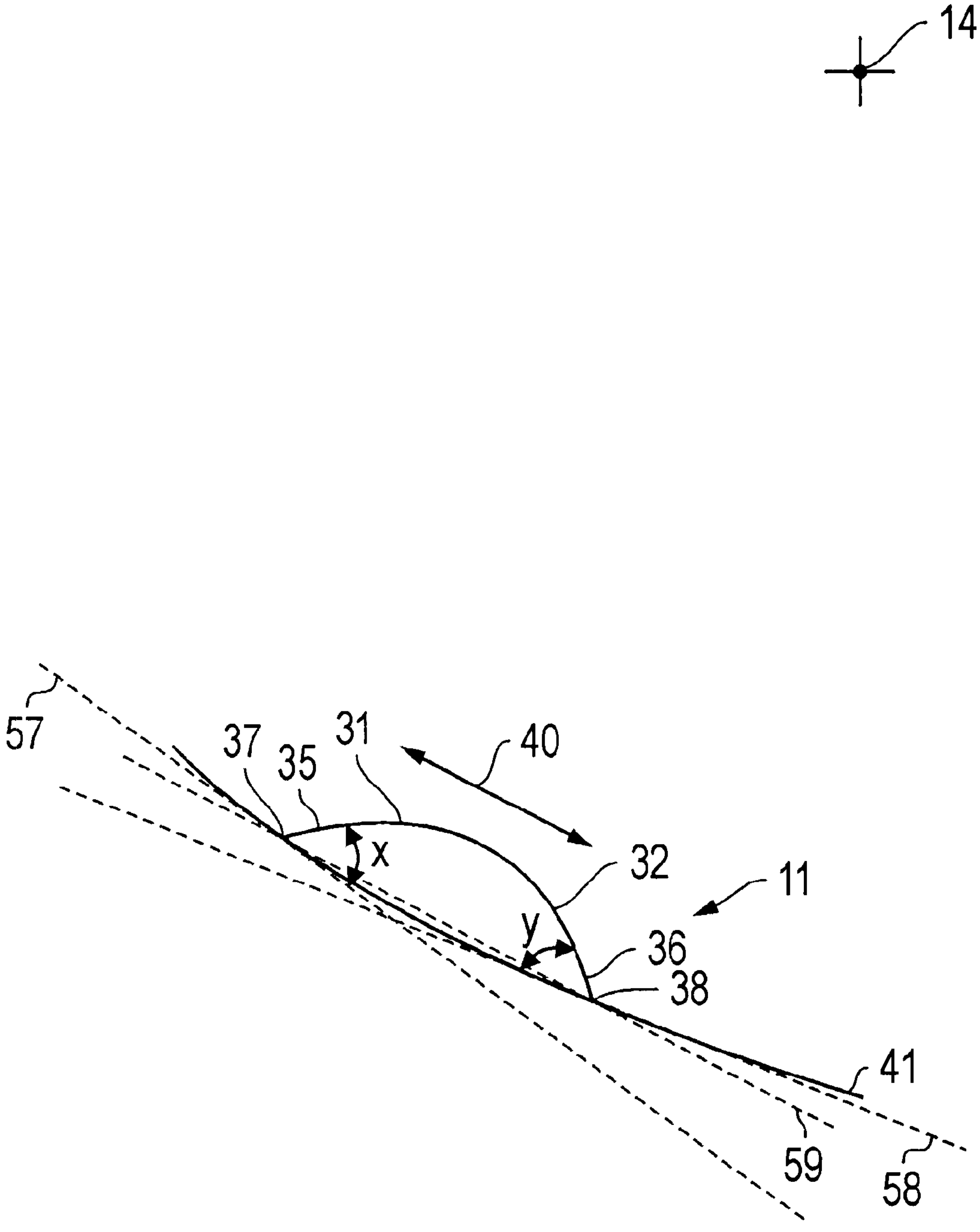
FIG. 6 is a diagrammatic representation of the scraper device shown in FIGS. 3 through 5, showing the relationship between the scraper device and the surface to be scraped and the drive axis about which the scraper device is driven.

The simplified diagrammatic illustration shown FIG. 6 may be used to describe the desired angles and component relationships in scraper device 11 according to the present invention. The diagrammatic representation shows the two flex arms 31 and 32 extending outwardly with respect to drive axis 14 toward the surface 41 to be scraped, with scraper plates 35 and 36 making contact with the surface at scraping edges 37 and 38, respectively. This is the position referred to above as the working position with respect to the scraper fixture 30. The scraper device 11 in which the flex arms and scraper plates are included is adapted to be driven along scraping axis or movement axis 40 in either direction as indicated by the arrows associated with the lines showing the movement axis. It will be appreciated from FIG. 6 that scraper device 11 actually moves along an arc as it is rotated about the axis of rotation defined by drive axis 14. Scraper device 11 is positioned with respect to the surface 41 to be scraped such that scraper plate 35 extends along a scraping plane at an acute scraping angle X to a line 57 tangent to the surface 41 at the point of contact of scraping edge 37. Similarly, scraper plate 36 extends along a respective scraping plane at an acute scraping angle Y to a line 58 tangent to the surface 41 at the point of contact of scraping edge 38. Scraping angles X and Y may be in the range from approximately 15 degrees to 30 degrees, although angles out of this preferred range may be used within the scope of the invention. It will be noted that first scraping edge 37 and second scraping edge 38 define a device plane shown at reference numeral 59 in FIG. 6. In the relaxed condition of the flex arms 31 and 32 when the scraper device is spaced apart from and does not make contact with the surface 41 to be scraped, scraper plates 35 and 36 may extend at an angle to device plane 59 in the range from 5 degrees to 20 degrees. Again, angles outside of this range may be used within the scope of the present invention.

The angles X and Y may vary from one application of the present invention to the next depending upon a number of factors including the nature of the surface to be scraped and the type of material being cooked, cooled, or treated in the vessel, for example. Generally, smoother and more even surfaces to be scraped allow using relatively smaller scraping angles for angles X and Y. Where the surface to be scraped is relatively rough and/or uneven, steeper or larger scraping angles X and Y may be required for effective scraping.

Figure 7:
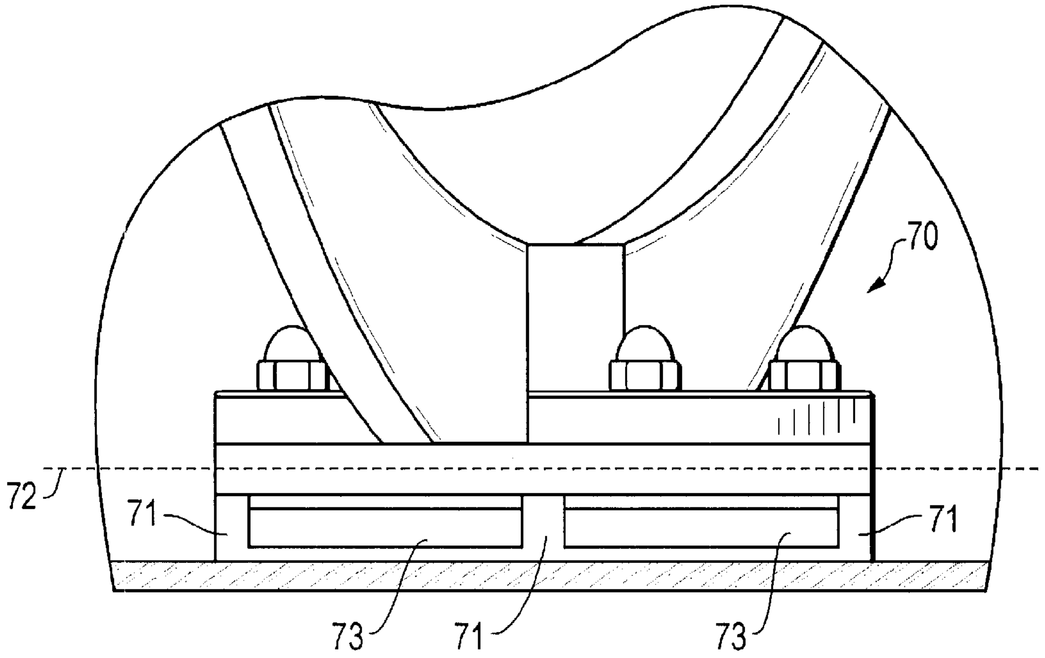
FIG. 7 is a front view of a scraper device similar to FIG. 3, but showing an alternate flex arm arrangement according to the present invention.

Referring to FIG. 7, an alternate scraper device 70 according to the invention is similar to the device shown in FIGS. 3 through 5. In this form of the invention however, the flex arms are made up of several separate members 71 spaced apart along the longitudinal axis 72 of scraper device 70. These separate flex arms leave openings 73 therebetween which effectively reduce the flow profile of scraper device 70. The lower profile reduces the forces that are applied to scraper device 70 as the device is moved though the material in the vessel. Thus, forms of the scraper device such as that shown in FIG. 7 apply relatively less force on the ribbon or other support structure as the support structure moves the scraper along the scraping or movement axis.

Figure 8:
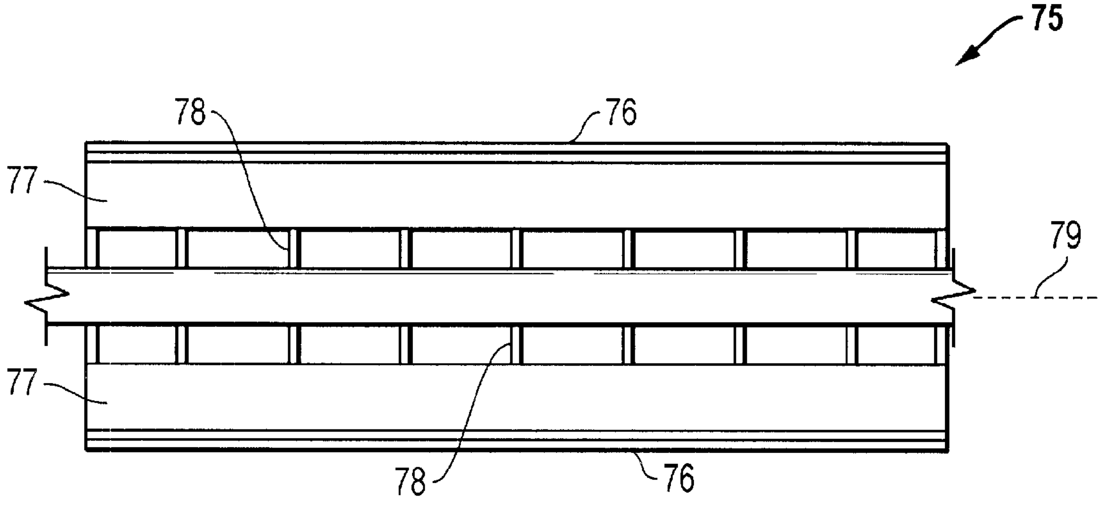
FIG. 8 is a side view of an alternate scraper device and scraper system embodying the principles of the invention.

FIG. 8 shows an alternate scraper system 75 and scraper device 76. In this form of the invention, each scraper device 76 extends longitudinally substantially the entire length of the vessel to be scraped (not shown). Rather than a helical mixing element such as that shown in FIG. 1, the embodiment of the invention shown in FIG. 8 includes vanes or paddles 77 that also extend substantially along the entire length of the vessel to be scraped. Paddles 77 are mounted on support members 78, and each respective long scraper device 76 is supported on a respective paddle. During each revolution of scraper system 75 about its drive axis 79, the form of the invention shown FIG. 8 scrapes substantially the entire surface of the vessel device once for each scraper device. This is in contrast to the version of the invention shown in FIG. 1 in which the entire surface is scraped only once for each revolution, with each scraper device 11 scraping only a small band of the total surface to be scraped. Scraping the vessel surface multiple times for each revolution of the scraper support structure allows the scraper support structure to be turned more slowly and still provide the desired scraping. This slower turning of the agitating device on which the scrapers are mounted may be helpful for certain foodstuffs and cooking or cooling operations. The scraper system 75 shown FIG. 8 includes two separate long scrapers mounted 180 degrees apart about the circumference of the support structure. Other forms of the invention may include three or more equally spaced apart long scrapers 76, and/or unevenly spaced scrapers.

It will be appreciated that the invention encompasses numerous variations on the particular long scraper form of the invention shown in FIG. 8. For example, long scrapers 76 may be supported on a helical agitating element or some other agitating element rather the illustrated paddles 77. Also, long scrapers 76 may be supported directly on a suitable support structure separate from the agitating element or elements and separate from any supports for the agitating element or elements.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A scraper device for scraping surfaces of a foodstuff heating or cooling vessel, the scraper device including:

(a) a scraper fixture having first upper and lower clamping surfaces and second upper and lower clamping surfaces;

(b) a first flex arm having a proximal end clamped between the first upper and lower clamping surfaces;

(c) a first scraper plate located at a distal end of the first flex arm;

(d) a second flex arm having a proximal end clamped between the second upper and lower clamping surfaces; and (e) a second scraper plate located at a distal end of the second flex arm.

2. The scraper device of claim 1 wherein the first flex arm includes a number of first flex members extending in the direction from the scraper fixture to the first scraper plate, the first flex members being spaced apart along a longitudinal axis of the scraper device leaving openings there between.

3. The scraper device of claim 2 wherein the second flex arm includes a number of second flex members extending in the direction from the scraper fixture to the second scraper plate, the second flex members being spaced apart along the longitudinal axis of the scraper device leaving openings there between.

4. The scraper device of claim 1 wherein the distal end of the first flex arm extends from the scraper fixture along an axis transverse to a longitudinal axis of the of the scraper device and the distal end of the second flex arm extends from the scraper fixture along the axis transverse to the longitudinal axis of the scraper device.

5. The scraper device of claim 1 wherein the first flex arm, first scraper plate, second flex arm, and second scraper plate are all formed from a common plate of material.

6. The scraper device of claim 5 wherein the first upper and lower clamping surfaces and the second upper and lower clamping surfaces of the scraper fixture mate together to define a curve which impresses a curvature on the common plate of material making up the first flex arm, first scraper plate, second flex arm, and second scraper plate.

7. The scraper of claim 1 wherein the scraper fixture is connected in a mixing ribbon and extends transversely with respect to the mixing ribbon on both sides of the mixing ribbon.

8. A scraper device for scraping surfaces of a foodstuff heating or cooling vessel, the scraper device including:

(a) a first scraping edge;

(b) a second scraping edge, the first scraping edge and second scraping edge defining a scraper plane and comprising opposite edges of a common plate of material; and (c) a substantially concave central relief surface between the first scraping edge and second scraping edge.

9. The scraper device of claim 8 further including a scraper fixture having upper and lower clamping surfaces, the common plate of material being clamped between the upper and lower clamping surfaces.

10. The scraper device of claim 9 wherein the upper and lower clamping surfaces of the scraper fixture mate together to define a curve which impresses a curvature on the common plate of material clamped between the upper and lower clamping surfaces.

11. The scraper device of claim 8 wherein the common plate of material adjacent to the first scraping edge extends at an angle of between 5 degrees and 20 degrees with respect to the scraper plane and the common plate of material adjacent to the second scraping edge each extends at an angle of between 5 degrees and 20 degrees with respect to the scraper plane.

12. The scraper device of claim 8 wherein at least the first scraping edge or the second scraping edge is made of a metal.

13. A scraper device including:

(a) a fixture adapted to be connected to a support structure and to be positioned with the support structure in a working position with respect to a surface to be scraped;

(b) a first flex arm having a proximal end supported by the fixture and having a distal end extending from the fixture toward the surface to be scraped when the fixture is in the working position;

(c) a first scraper plate connected to the distal end of the first flex arm and having a scraping edge extending transverse to a drive axis of the scraper device, the first scraper plate extending at an acute first scraping angle with respect to the surface to be scraped when the fixture is in the working position;

(d) a second flex arm having a proximal end supported by the fixture and having a distal end extending from the fixture toward the surface to be scraped in a direction opposite to the first flex arm along the drive axis of the scraper device; and (e) a second scraper plate connected to the distal end of the second flex arm and having a scraping edge extending transverse to the drive axis of the scraper device, the first scraper plate extending at an acute second scraping angle with respect to the surface to be scraped when the fixture is in the working position.

14. The scraper device of claim 13 wherein the acute first scraping angle and the acute second scraping angle are each between 15 degrees and 30 degrees.

15. The scraper device of claim 13 wherein the first scraper plate and the second scraper plate each contacts the surface to be scraped when the support fixture is in the working position, the contact between the first scraper plate and the surface to be scraped flexing the first flex arm so that the first flex arm presses the first scraper plate against the surface to be scraped, and the contact between the second scraper plate and the surface to be scraped flexing the second flex arm so that the second flex arm presses the second scraper plate against the surface to be scraped.

16. The scraper device of claim 13 wherein the first scraper plate and the first flex arm lie substantially in a common first plane, and the second scraper plate and the second flex arm lie substantially in a common second plane.

17. The scraper device of claim 16 wherein the first scraper plate and the first flex arm are integrally formed from a first plate of material and the second scraper plate and the second flex arm are integrally formed from a second plate of material.

18. The scraper device of claim 17 wherein the first plate of material and second plate of material comprise opposite ends of a common sheet of material.

19. The scraper device of claim 18 wherein the fixture includes upper and lower clamping surfaces and wherein the common sheet of material making up the first flex arm, first scraper plate, second flex arm, and second scraper plate are clamped between the upper and lower clamping surfaces.

20. The scraper device of claim 13 wherein the scraping edge of the first scraper plate and the scraping edge of the second scraper plate each extends substantially the entire length of the surface to be scraped.

21. A scraper system for scraping a vessel surface, the scraper system including:

(a) a support structure mounted within a vessel and adapted to be driven about a drive axis parallel to a longitudinal axis of the vessel surface;

(b) a scraper fixture mounted on the support structure and adapted to be moved on the support structure through an arc adjacent to the vessel surface in a scraping direction of rotation about the drive axis;

(c) a flex arm having a proximal end connected to the scraper fixture and a distal end extending outwardly from the drive axis and in the scraping direction; and (d) a scraper plate connected to the distal end of the flex arm, the scraper plate extending in a scraping plane lying at an acute scraping angle to a tangent line intersecting a point at which a scraping edge of the scraper plate meets the vessel surface.

22. The scraper system of claim 21 wherein the acute scraping angle is between 15 degrees 2 and 30 degrees.

23. The scraper system of claim 21 wherein the scraper plate contacts a surface to be scraped when the scraper fixture is in a working position with respect to the surface to be scraped and the contact between the scraper plate and the surface to be scraped deflects the flex arm in a direction away from the surface to be scraped.

24. The scraper system of claim 21 wherein the scraper plate and the flex arm are integrally formed from a common plate of material.

25. The scraper system of claim 24 wherein the scraper fixture includes upper and lower clamping surfaces and wherein the common plate of material making up the flex arm and scraper plate is clamped between the upper and lower clamping surfaces.

26. The scraper system of claim 21 further including:

(a) an additional flex arm having a proximal end connected to the scraper fixture and a distal end extending outwardly from the drive axis and in a direction opposite to the scraping direction; and an additional scraper plate connected to the distal end of the additional flex arm, the additional scraper plate extending in an additional scraping plane lying at an additional acute scraping angle to a tangent line intersecting a point at which a scraping edge of the additional scraper plate meets the vessel surface.

27. The scraper system of claim 26 wherein the scraper plate, the flex arm, the additional scraper plate, and the additional flex arm are integrally formed from a common plate of material.

28. The scraper system of claim 27 wherein the scraper fixture includes upper and lower clamping surfaces and wherein the common plate of material making up the flex arm, the scraper plate, the additional flex arm, and the additional scraper plate is clamped between the upper and lower clamping surfaces.

* * * * *

UNITED STATES PATENT AND TRADEMARK OFFICE

CERTIFICATE OF CORRECTION

PATENT NO. : 6,694,867 B1 
DATED : February 24, 2004
INVENTOR(S) : Eldon Roth

It is certified that error appears in the above-identified patent and that said Letters Patent is hereby corrected as shown below:

<u>Column 12, lines 60-66 through Column 13, lines 1-4,</u>
Replace claim 26 with the following:
26. The scraper system of Claim 21 further including:
(a) an additional flex arm having a proximal end connected to the scraper fixture and a distal end extending outwardly from the drive axis and in a direction opposite to the scraping direction; and
(b) an additional scraper plate connected to the distal end of the additional flex arm, the additional scraper plate extending in an additional scraping plane lying at an additional acute scraping angle to a tangent line intersecting a point at which a scraping edge of the additional scraper plate meets the vessel surface.

Signed and Sealed this

Twenty-seventh Day of July, 2004

JON W. DUDAS
*Acting Director of the United States Patent and Trademark Office*